(12) United States Patent
Ryan

(10) Patent No.: US 7,475,884 B2
(45) Date of Patent: Jan. 13, 2009

(54) CUPHOLDER FOR MOUNTING ON BASKET OF SHOPPING CART

(75) Inventor: Mark T. Ryan, Haskell, OK (US)

(73) Assignee: Unarco Industries, Inc., Wagoner, OK (US)

( * ) Notice: Subject to any disclaimer, the term of this patent is extended or adjusted under 35 U.S.C. 154(b) by 233 days.

(21) Appl. No.: 11/598,488

(22) Filed: Nov. 13, 2006

(65) Prior Publication Data

US 2007/0085283 A1    Apr. 19, 2007

Related U.S. Application Data

(63) Continuation-in-part of application No. 11/252,937, filed on Oct. 18, 2005, now Pat. No. 7,219,901.

(51) Int. Cl.
*B62D 39/00* (2006.01)
(52) U.S. Cl. ............... 280/33.992; 280/DIG. 4; 224/926; 224/411
(58) Field of Classification Search ............ 280/33.992, 280/33.991, DIG. 4; 248/311.2, 312.1; 224/926, 224/411, 414, 425, 434
See application file for complete search history.

(56) References Cited

U.S. PATENT DOCUMENTS

| | | | | |
|---|---|---|---|---|
| 1,077,027 A | * | 10/1913 | Austin | .................. 248/315 |
| 2,601,571 A | * | 6/1952 | Sverkerson | .................. 211/74 |
| 2,763,413 A | * | 9/1956 | Felton | .................. 224/411 |
| 2,995,333 A | * | 8/1961 | Pazzano | .................. 248/230.7 |
| 3,021,106 A | * | 2/1962 | Kramer | .................. 248/231.71 |
| 3,734,439 A | * | 5/1973 | Wintz | .................. 248/224.51 |
| 4,526,124 A | * | 7/1985 | Hartwall | .................. 114/219 |
| 5,060,832 A | * | 10/1991 | Link | .................. 224/414 |

\* cited by examiner

*Primary Examiner*—Christopher P Ellis
*Assistant Examiner*—John D Walters
(74) *Attorney, Agent, or Firm*—Wood, Phillips, Katz, Clark & Mortimer

(57) ABSTRACT

A cupholder, which is mountable to a wall of a basket of a shopping cart, comprises a continuous wire having two lowermost portions, between and to which the outer mounting plate is mounted, two intermediate portions, which define a cup-supporting level and on which a cup-supporting plate is seated, and an uppermost portion, which is shaped to embrace a cup being held by the cupholder. The continuous wire has two lower connecting portions, each of which connects one of the lowermost portions to one of the intermediate portions, and two upper connecting portions, each of which connects one of the intermediate portions to the uppermost portion.

18 Claims, 2 Drawing Sheets

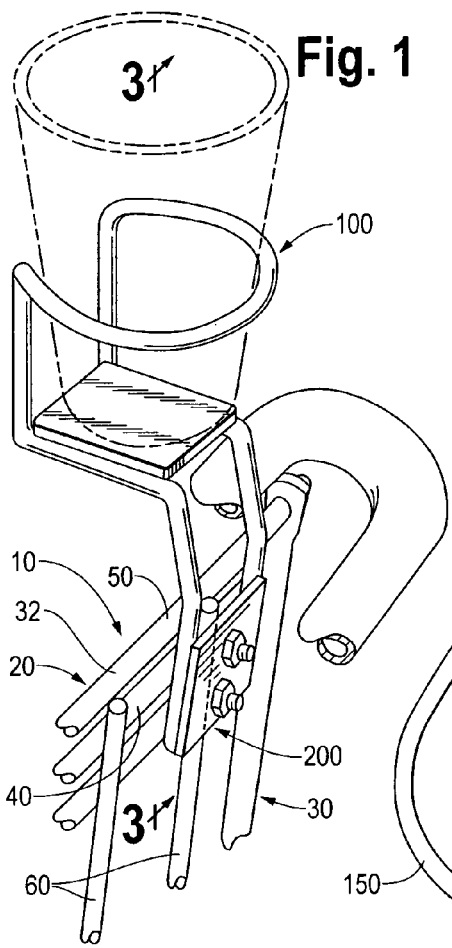
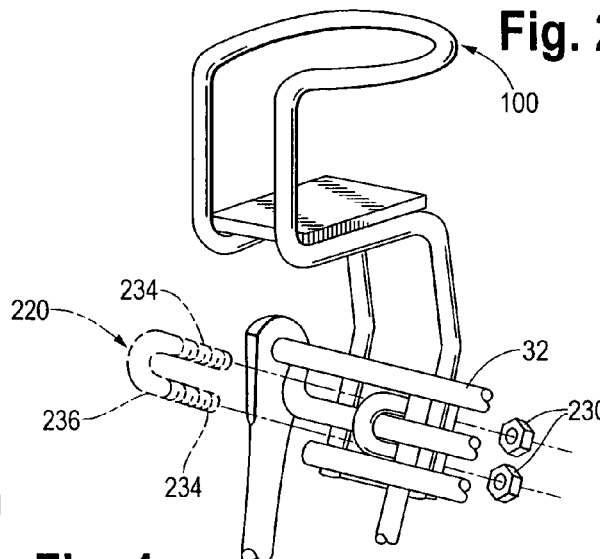
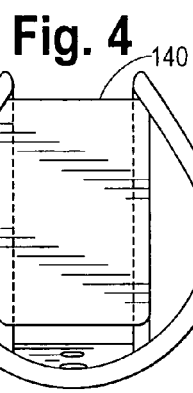
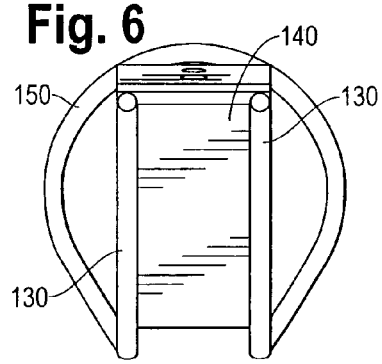
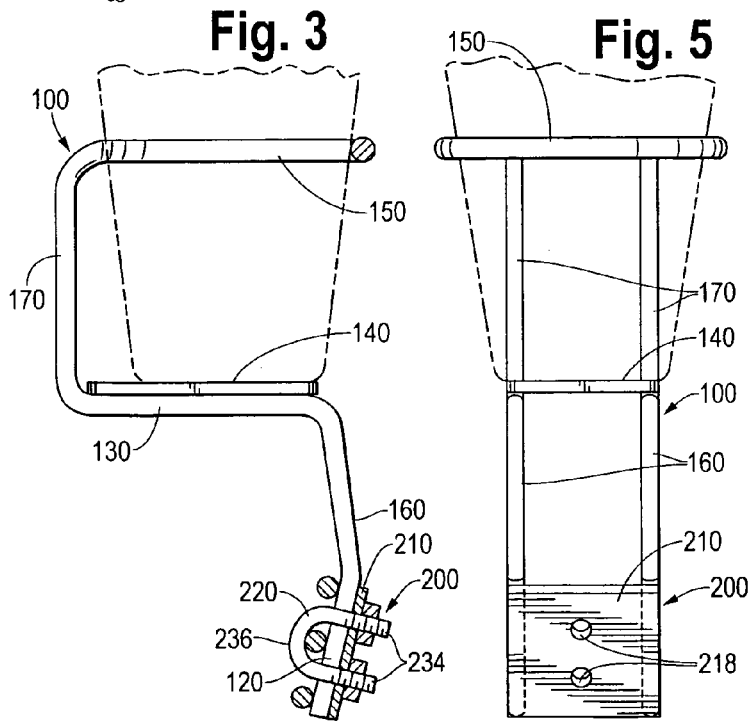
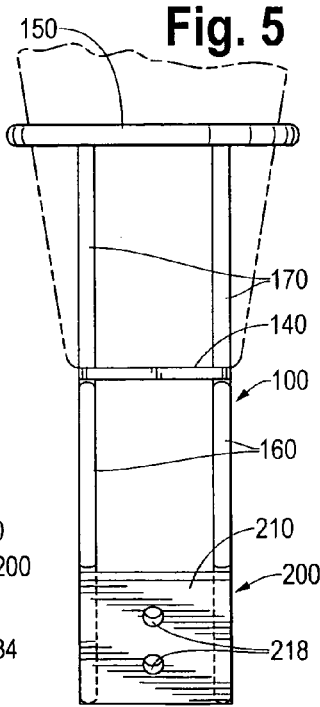
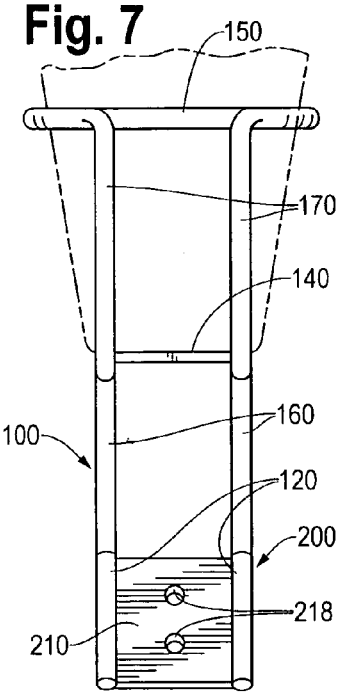

US 7,475,884 B2

CUPHOLDER FOR MOUNTING ON BASKET OF SHOPPING CART

CROSS REFERENCE TO RELATED APPLICATIONS

This application is a continuation-in-part of U.S. patent application Ser. No. 11/252,937, which was filed on Oct. 18, 2005, and the disclosure of which is hereby incorporated by reference.

TECHNICAL FIELD OF THE INVENTION

This invention pertains to a cupholder, which is mountable to a wall of a basket of a shopping cart.

BACKGROUND OF THE INVENTION

As exemplified in prior patents including, among other patents, U.S. Pat. Nos. 5,494,306, 5,938,091, 6,186,382, 6,644,524, and 6,832,768, it has been known to provide handles, seat bases of child seats, and other components of shopping carts with cupholders, which shoppers can use to hold cups containing coffee, soft drinks, or other beverages.

SUMMARY OF THE INVENTION

This invention provides for a shopping cart having a basket, which has walls and which has an upper edge, a cupholder, which is mountable to one of the walls, via a mounting plate. The cupholder comprises a continuous wire having two lowermost portions, at which the continuous wire terminates and between and to which the mounting plate is mounted, two intermediate portions, which define a cup-supporting level, and an uppermost portion, which is shaped so as to embrace a cup being held by the cupholder. The cupholder extends up and across the upper edge of the basket when the cupholder is mounted to one of the side walls of the basket.

Preferably, the continuous wire has two lower connecting portions, each of which connects one of the lowermost portions to one of the intermediate portions, and two upper connecting portions, each of which connects one of the intermediate portions to the uppermost portion. Preferably, the cupholder comprises a cup-supporting plate, which is seated on the intermediate portions of the continuous wire.

BRIEF DESCRIPTION OF THE DRAWINGS

FIGS. 1 and 2 are each a perspective view of a cupholder and a mounting means, by which the cupholder is mounted to a wall of a basket of a shopping cart.

FIGS. 3, 4, 5, 6 and 7, are, respectively, a side plan, a top plan, a front elevation, a bottom plan, and a rear elevation, of the cupholder and the mounting means.

DETAILED DESCRIPTION OF THE ILLUSTRATED EMBODIMENT

Figure 8:
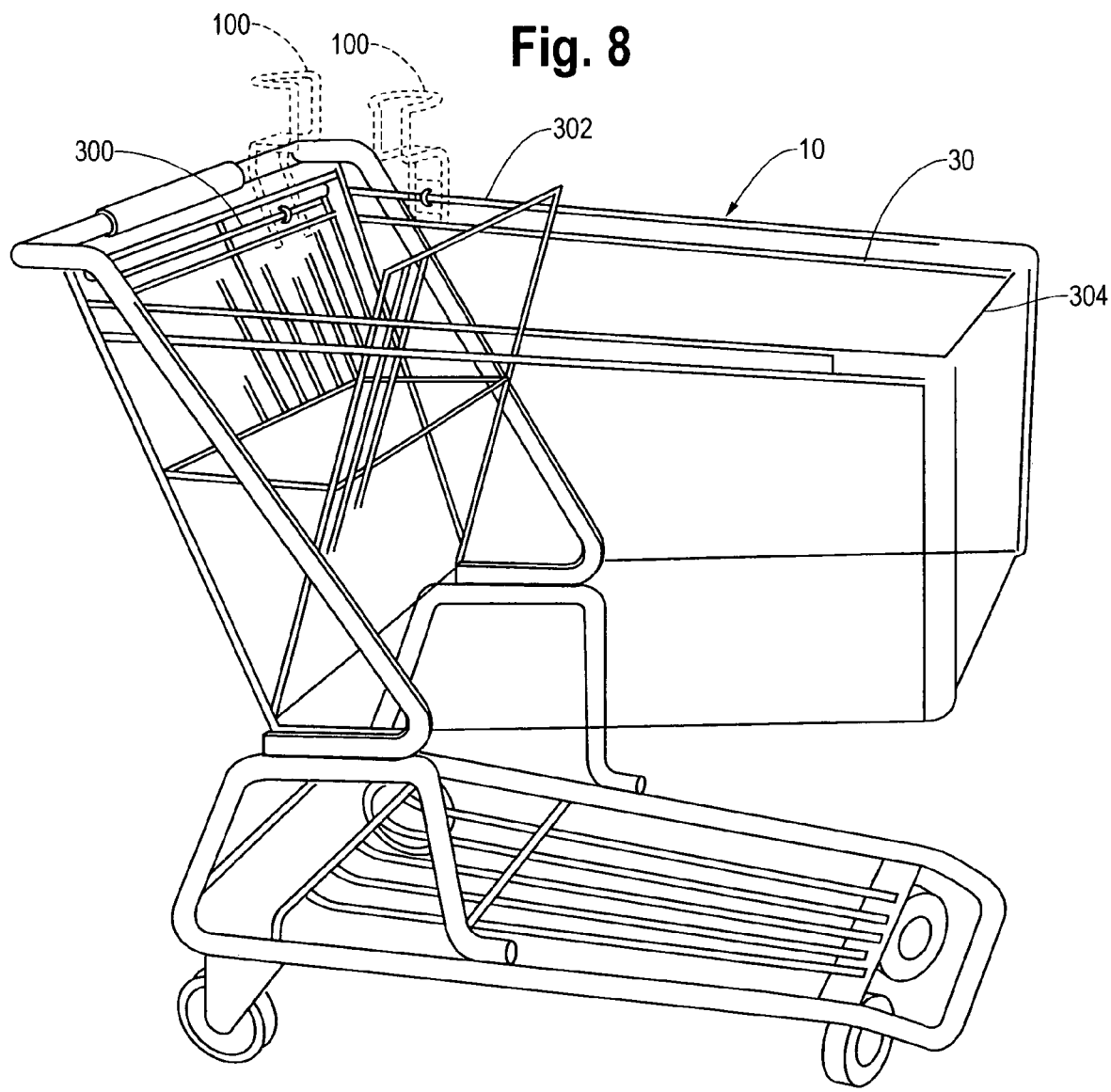
FIG. 8 depicts two of the various locations where a cupholder and the mounting means may be located on a shopping cart.

As illustrated in FIG. 1, a cupholder 100 is mounted to a shopping cart 10 by a mounting means 200, which is employed to mount the cupholder 100 to a wall 20 of a basket 30 of the shopping cart 10. The basket has an upper edge 32. The wall 20 of the basket 30 of the shopping cart 10 has a pattern of substantially rectangular apertures 40, which are defined by substantially horizontally extending wires 50 and by substantially vertically extending wires 60.

The mounting means 200 comprises a mounting plate 210, which is positionable outside and against the wall 20, at a given aperture 40, a mounting bracket, such as the U-bolt 220, and at least one fastener 230, which may be threaded. The mounting plate 210 has at least one opening 218. The mounting bracket or U-bolt 220 has two ends 234 and an intermediate retaining portion 236 located between the two ends 234. The ends 234 of the mounting bracket 220 are adapted to extend through the aperture 40, into a openings 218 in the mounting plate 210, for fastening the mounting plate 210 and mounting bracket 220, when so positioned, to each other, so as to mount the cupholder 200 to the wall 20.

The mounting bracket 210 extends through the wall 20, around a portion of the wall, such as a horizontal wire 32, and back through the wall 20. Specifically, the intermediate retaining portion 236 is located on the opposite side of the wall, as compared to the furthest portion of the ends 234. The ends 234 are retained at the mounting plate 210 by the fasteners 230. Both the fasteners 230 as well as the ends 234 may be compatibly threaded to retain the mounting bracket 220 relative to the mounting plate 210. It should be understood by those skilled in the art that the mounting plate 210 and mounting bracket 220 may be modified such that the relative positions are switched relative to the wall 20.

The cupholder 100 comprises a continuous wire 110 having two lowermost portions 120, which extend downwardly, at which the continuous wire 110 terminated, and between and to which the outer mounting plate 210 is welded or is mounted otherwise. Moreover, the continuous wire 110 has two intermediate portions 130, which extend horizontally, which define a cup-supporting level, and on which a cup-supporting plate 140 is seated, and an uppermost portion 150, which has a curved shape adapting the uppermost portion 150 to embrace a cup being held by the cupholder 100. Furthermore, the continuous wire 1 10 has two lower connecting portions 160, each of which connects one of the lowermost portions 120 to one of the intermediate portions 130, and two upper connecting portions 170, each of which connects one of the lowermost portions to the uppermost portion. The cup-supporting plate 140, which is an element of the cupholder 100, is welded or is mounted otherwise to the intermediate portions 130 of the continuous wire 110.

As illustrated in the figures, the cupholder 100 is arranged so as to extend up and across the edge 32 of the basket 30 when the cupholder 100 is mounted to the side wall 20 of the basket 30.

Referring to FIG. 8, it should be understood by those skilled in the art that the cupholder 100 may be located in a variety of different locations on the shopping cart 10. For example, two of the preferred locations are illustrated in FIG. 8 along a back wall 300 and a side wall 302. It should be noted that the most of the wires 50 and 60 have not been shown in this figure instead focusing on the location of the cupholder 100 on the shopping cart 10. It should be understood that the cupholder 100 may be located elsewhere on the basket 30 of the shopping cart 10.

The invention claimed is:

1. For a shopping cart having a basket, which has walls and which has an upper edge, a cupholder, which is mountable to one of the walls, via a mounting plate, wherein the cupholder comprises a continuous wire having two lowermost portions, at which the continuous wire terminates and between and to which the one of the outer and inner mounting plates is mounted, two intermediate portions, which define a cup-supporting level, and an uppermost portion, which is shaped so as to embrace a cup being held by the cupholder, wherein the cupholder extends above and across the upper edge of the basket when the cupholder is mounted to one of the walls via the mounting plate.

2. The cupholder of claim 1, wherein the continuous wire has two lower connecting portions, each of which connects one of the lowermost portions to one of the intermediate portions, and two upper connecting portions, each of which connects one of the intermediate portions to the uppermost portion.

3. The cupholder of claim 1, wherein the cupholder comprises a cup-supporting plate, which is seated on the intermediate portions of the continuous wire.

4. The cupholder of claim 2, wherein the cupholder comprises a cup-supporting plate, which is seated on the intermediate portions of the continuous wire.

5. The cupholder of claim 1, wherein the cupholder comprises a continuous wire having two lowermost portions, at which the continuous wire terminates and between and to which the outer mounting plate is mounted, two intermediate portions, which define a cup-supporting level, and an uppermost portion, which is shaped so as to embrace a cup being held by the cupholder.

6. The cupholder of claim 5, wherein the continuous wire has two lower connecting portions, each of which connects one of the lowermost portions to one of the intermediate portions, and two upper connecting portions, each of which connects one of the intermediate portions to the uppermost portion.

7. The cupholder of claim 5, wherein the cupholder comprises a cup-supporting plate, which is seated on the intermediate portions of the continuous wire.

8. The cupholder of claim 6, wherein the cupholder comprises a cup-supporting plate, which is seated on the intermediate portions of the continuous wire.

9. The cupholder of claim 1 further comprising a U-bolt having two ends and a retaining portion located between the two ends, such that when the cupholder is mounted to one of the walls, the mounting plate is located on one side of the wall, the retaining portion is located on the other side of the wall and the two ends extend through the wall.

10. The cupholder of claim 9 wherein at least a portion of the two ends extend through the mounting plate and are retained by fasteners.

11. For a shopping cart having a basket, which has walls and which has an upper edge, a cupholder, which is mountable to one of the walls, via a mounting plate, wherein the cupholder comprises a continuous wire having two lowermost portions, at which the continuous wire terminates and between and to which the one of the outer and inner mounting plates is mounted, two intermediate portions, which define a cup-supporting level, and an uppermost portion, which is shaped so as to embrace a cup being held by the cupholder, the cupholder being mounted to one of the walls by a mounting bracket having two ends fastened to the mounting plate and extending through wall joined by an intermediate retaining portion, wherein the cupholder extends above and across the upper edge of the basket when the cupholder is mounted to one of the walls via the mounting plate.

12. The cupholder of claim 11, wherein the continuous wire has two lower connecting portions, each of which connects one of the lowermost portions to one of the intermediate portions, and two upper connecting portions, each of which connects one of the intermediate portions to the uppermost portion.

13. The cupholder of claim 11, wherein the cupholder comprises a cup-supporting plate, which is seated on the intermediate portions of the continuous wire.

14. The cupholder of claim 12, wherein the cupholder comprises a cup-supporting plate, which is seated on the intermediate portions of the continuous wire.

15. The cupholder of claim 11, wherein the cupholder comprises a continuous wire having two lowermost portions, at which the continuous wire terminates and between and to which the outer mounting plate is mounted, two intermediate portions, which define a cup-supporting level, and an uppermost portion, which is shaped so as to embrace a cup being held by the cupholder.

16. The cupholder of claim 15, wherein the continuous wire has two lower connecting portions, each of which connects one of the lowermost portions to one of the intermediate portions, and two upper connecting portions, each of which connects one of the intermediate portions to the uppermost portion.

17. The cupholder of claim 15, wherein the cupholder comprises a cup-supporting plate, which is seated on the intermediate portions of the continuous wire.

18. The cupholder of claim 16, wherein the cupholder comprises a cup-supporting plate, which is seated on the intermediate portions of the continuous wire.

* * * * *